United States Patent

[11] 3,598,239

| | | |
|---|---|---|
| [72] | Inventors | Svatopluk Mackrle;<br>Vladimir Mackrle, both of Prague, Czechoslovakia |
| [21] | Appl. No | 868,266 |
| [22] | Filed | Oct. 2, 1969 |
| [45] | Patented | Aug. 10, 1971 |
| [73] | Assignee | Hydroconsult Bratislava<br>Bratislava, Czechoslovakia |
| [32] | Priority | May 8, 1968 |
| [33] | | Czechoslovakia |
| [31] | | PV 3404/68<br>Continuation of application Ser. No. 822,383, May 7, 1969, now abandoned. |

[54] APPARATUS FOR WATER TREATMENT
9 Claims, 2 Drawing Figs.

[52] U.S. Cl. ................................................... 210/203, 210/208
[51] Int. Cl. ................................................ B01d 21/01
[50] Field of Search ........................................... 210/49, 203, 208, 219

[56] References Cited
FOREIGN PATENTS
535,498  4/1941  Great Britain .......... 210/219

*Primary Examiner*—J. L. DeCesare
*Attorney*—Michael S. Striker

ABSTRACT: A high-output arrangement for water treatment combining in a single housing a number of spaces for coagulation and homogenization, spaces where a perfectly fluidized sludge blanket is maintained, sedimentation spaces and high-rate filter spaces. The spaces for the fluidized sludge blanket have bottoms formed by downwardly converging walls extending over the entire width of the housing and alternately forming roof-shaped tops of homogenizing spaces and of sedimentation spaces as well as the bottoms for the sludge blanket spaces above them. Filter spaces are provided below the homogenizing spaces, separated therefrom by horizontal walls composed of adjacent beams with first channels provided with openings into the sedimentation spaces and connected with the drain, and second channels provided with openings into the filter spaces and connected to collecting means for clear water. The homogenizing space is provided with agitator means, and raw water with a coagulation agent is supplied into said space.

APPARATUS FOR WATER TREATMENT

CROSS-REFERENCE TO RELATED APPLICATION

A related application, of which the present is a continuation, was filed on May 7, 1969 under Ser. No. 822,383, now abandoned.

This invention relates to an arrangement for water treatment for removal of impurities contained in the water, and employing coagulation and two-stage separation of the floccular suspension which is maintained as a perfectly fluidized sludge blanket, with subsequent filtration; the arrangement is particularly suitable for water treatment plants of high output.

The trend of development for water treatment arrangements shows a tendency to combine all stages of chemical water purification in a single compact unit. Similar units are already in operation for smaller outputs.

Such smaller units use sludge-blanket clarifiers with a vertical concentric arrangement and with a central coagulation chamber. With the centrally designed coagulation chamber it is easily possible to achieve a perfect and hydraulically satisfactory interconnection of the coagulation chamber with the chamber containing the perfectly fluidized sludge blanket via a single circular slot. The raw water with coagulants is in such arrangements supplied into the upper part of the coagulation chamber, where a rotating motion is imparted to it and where it descends along a helical line into the lower part and enters uniformly into the space containing the sludge blanket.

The central arrangement of the coagulation chamber enables an easy adjustment of this space for homogenizing the suspension obtained by coagulation by prolonging the dwell time of the suspension in this space and by applying mechanical means for creating a turbulent movement.

A drawback of these known arrangements for water treatment combining the steps of coagulation, homogenization and separation of the suspension in a single unit, is the use of a clarifier with a vertical and concentric arrangement which provides for only a limited output because for larger outputs this construction is not suitable. The vertical concentric arrangement in connection with a high-rate filter is, from the point of view of utilization of the whole space for larger outputs, not advantageous and makes the distribution of the individual functional spaces very difficult.

In addition to the concentric arrangement of a single slot clarifier with a perfectly fluidized sludge blanket there is a multislot clarifier, where the individual functional spaces are joined horizontally one to the other so that a coagulation and a thickening space are always contiguous to a space containing a perfectly fluidized sludge blanket. By this arrangement a substantial saving in the height of the arrangement is achieved and it is possible to design clarifiers with very large outputs.

Multislot clarifiers, however, have until now not been designed so as to create by inclusion of a high-rate filter in a single common container a compact unit similar to already existing small units. One reason that up to now no such multislot clarifier has been designed which would combine the clarifier and high-rate filter in a common unit was the lack of an effective solution of the homogenization of the suspension created by coagulation in horizontal coagulation chambers.

A bar to achievement of the homogenization in multislot clarifiers of known design was the absence of a mechanical source of turbulence in the coagulation space, a relatively limited volume of this space and an unsuitable system of distribution of the dosed raw water into the coagulation space. The horizontal prismatic shape of the homogenizing spaces of multislot clarifiers prohibits the application of the commonly used type of mechanical paddles as means for generating a turbulent movement. This shape substantially differs from current clarifiers, where the coagulation space is vertical and always arranged centrally. The introduction of a mechanical movement for instance by means of paddles in a horizontally arranged coagulation space would cause a rotation of the water such as would interfere with the passage through the separating slot connecting the coagulation space with the space containing the sludge blanket. The raw water distribution in the coagulation space of known multislot clarifiers by means of distributing conduits in the upper part of this space is in case of the application of mechanical paddles unsuitable as it does not safeguard a uniform homogenization of the whole content of this space, causing water short circuits from the distributing conduit directly into the slot. The limited volume of the coagulation space is determined for multislot clarifiers by the overall geometric arrangement of the clarifier as it is limited by downwards converging walls of the bottom of the space containing the perfectly fluidized sludge blanket in direction towards the gap, which design cannot be altered without impeding other functional properties of the clarifier. In order to achieve a maximum homogenizing effect, it is necessary to prolong the dwelling of the water in the coagulation space about up to 15 minutes, secure a suitable source of turbulent movement and a uniform homogenization, a better raw water supply to the homogenizing space, and to prevent any interference of the rotation of the water in the homogenizing space with the passage of the water through the separating gap between the homogenizing space and the space containing the perfectly fluidized sludge blanket. Due to lack of perfect homogenizing the equivalent effect as in small units using homogenizing space has not thus far been achieved and a substantially worse function of the arrangement up to 40 percent at reduced water temperature is the result. A second reason why similar arrangements for high outputs combining a multislot clarifier and a high-rate filter in a single common container have not yet been designed was the unsolved location for the high-rate filter and its separation from the remaining spaces of the clarifier, as the separating wall used is subject to pressure of the weight of the whole liquid column in the clarifier, so that for a large area a massive false bottom must be arranged, which together with the sludge removal system and the collecting system of the clarified water and with the high-rate filter would cause complications and a substantial increase of the height of the whole arrangement.

It is the principal object of this invention to provide a multislot clarifier using a perfectly fluidized sludge blanket with a high-rate filter for high outputs which is compact in design and requires only a limited height.

It is another object of this invention to provide in horizontal homogenizing spaces means for effectively and uniformly homogenizing the whole content of said spaces.

It is a further object of this invention to provide an adequate supply of the raw water into the homogenizing space to enable effective homogenizing liquid suspension into the space containing the perfectly fluidized sludge blanket, thus eliminating any ill effects on the sludge blanket which is maintained in a floating condition.

It is finally a further object of this invention to provide a separating wall between the space containing a high rate filter and the sedimentation space above it, which is capable of withstanding the pressure of the weight of the whole water column above it and simultaneously can serve for removal of sludge and for distribution of the clarified water to the high rate filter.

Bearing these and other objects in mind, we propose an arrangement for water treatment comprising homogenizing spaces, spaces with a perfectly fluidized sludge blanket, sedimentation spaces and spaces with high rate filters forming a single unit, where the bottoms of the spaces containing the perfectly fluidized sludge blanket, sedimentation spaces and spaces with high rate filters forming a single unit, where the bottoms of the spaces containing the perfectly fluidized sludge blanket are formed by downwardly converging walls, which simultaneously represent roof-shaped tops of alternately arranged homogenizing and sedimentation spaces. The filter spaces are arranged below the sedimentation spaces and separated therefrom by horizontal walls composed of adjacent beams with first longitudinal channels with openings into the sedimentation space and connected to the drain and with second longitudinal channels with openings into the filter space, with clear water collecting means from the space with the perfectly fluidized sludge blanket and from sedimentation spaces terminating into said second channels. Agitator means are provided in the homogenizing spaces with means for the supply of raw water with coagulation agents.

An exemplary embodiment of an arrangement for water treatment according to this invention is shown schematically in the accompanying drawings.

DESCRIPTION OF THE PREFERRED EMBODIMENTS

Figure 1:
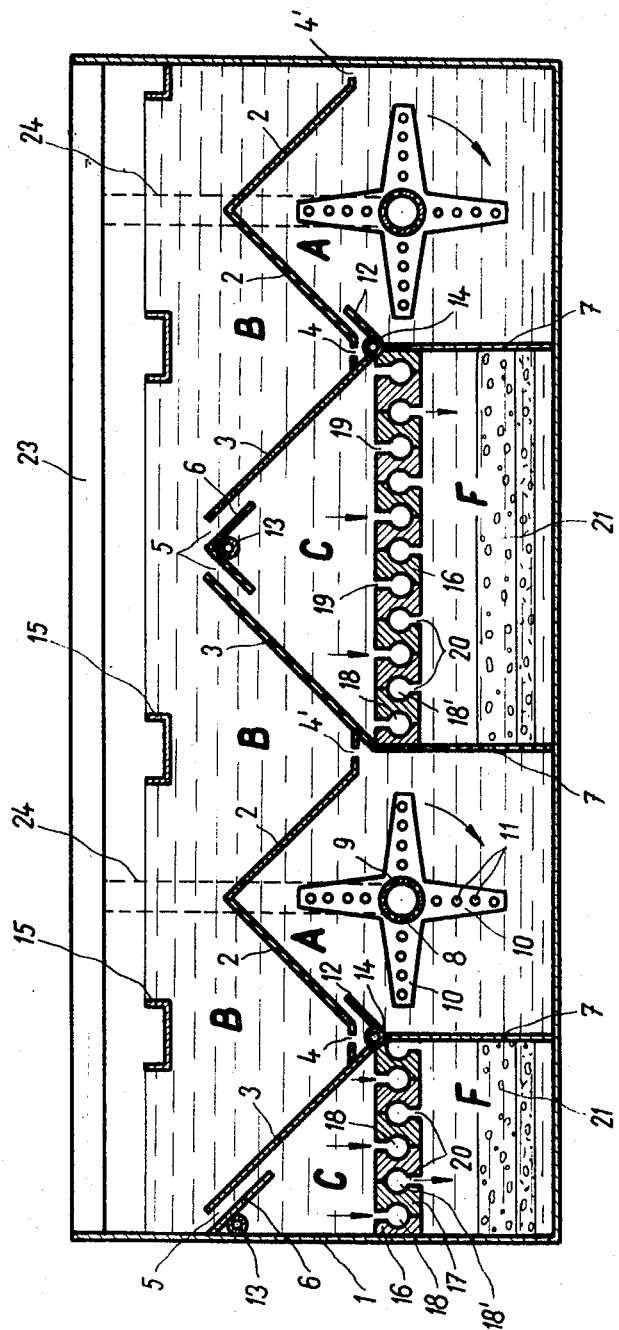
FIG. 1 represents a sectional elevation.
Figure 2:
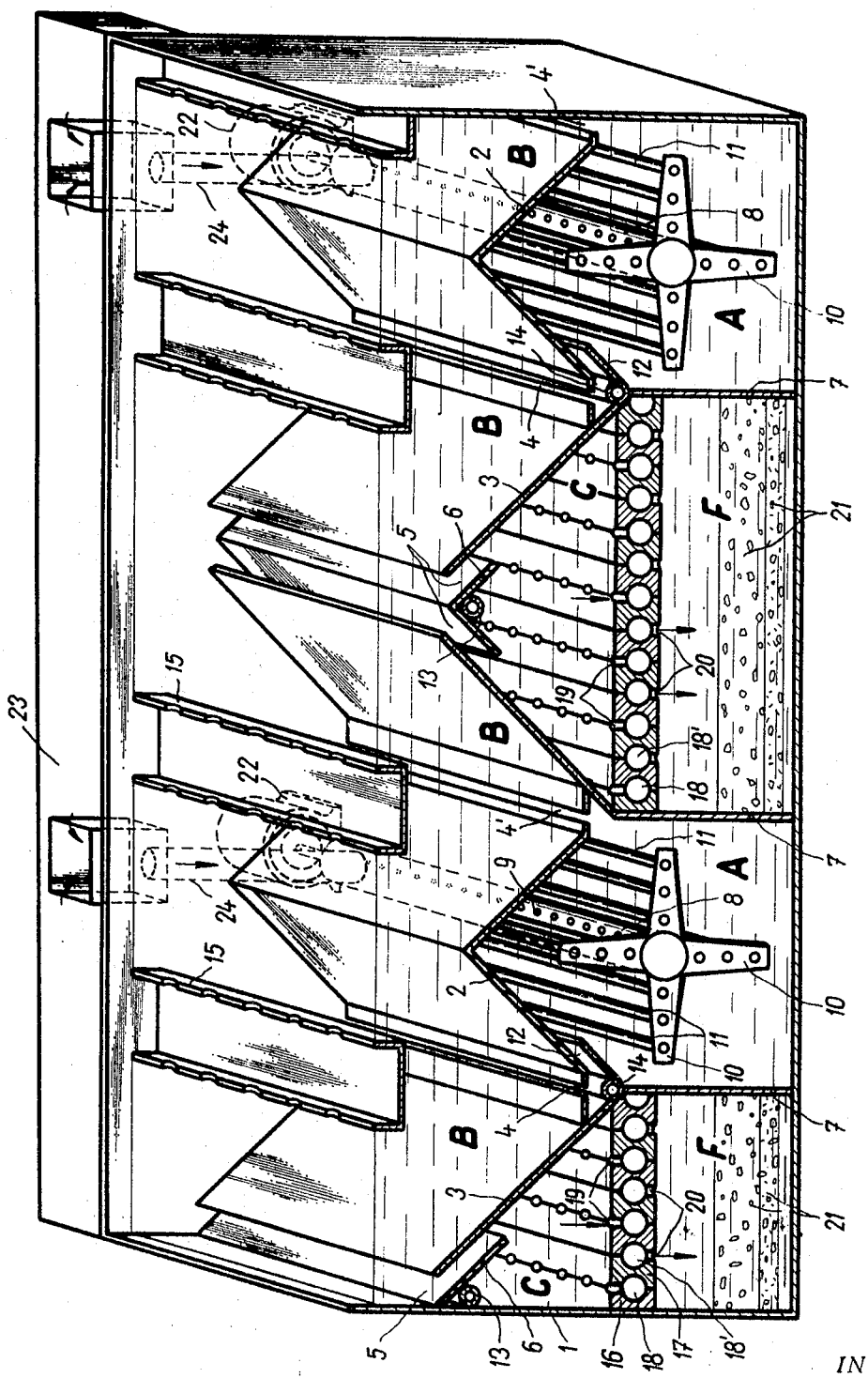
FIG. 2 is a simplified axonometric view of an embodiment of the invention.

The whole arrangement as shown in FIG. 1 and FIG. 2 is placed in a single, substantially prismatic container 1, where by means of walls 2, 3, 7 and 16, which extend along the whole width of the container 1, the following spaces are defined: the homogenizing spaces A, the spaces B containing a perfectly fluidized sludge blanket, the sedimentation spaces C and spaces F with high-rate filters. The walls 2 form a roof-shaped top of the homogenizing spaces A, having at the bottom at both sides longitudinal slots 4, 4' which connect the spaces A and B; furthermore the walls 3 form a roof-shaped top above the sedimentation spaces C, having at the top an inlet slot 5 from the space B to space C, with a roof-shaped distributor baffle 6 adjusting the inlet of the sludge blanket into the space C. Vertical walls 7 are provided at the lower ends of walls 3, separating the homogenizing spaces A from the spaces F with high-rate filters.

A horizontal hollow shaft 8 is rotatably arranged in the coagulation and homogenizing spaces A, said shaft being provided over its entire length with openings 9 and being driven by a drive at a speed of units of revolution per minute. The hollow shaft 8 is connected to the conduit 24 supplying raw water with a coagulant. Arms 10 are fixed to the shaft 8 and provided with paddles, in the illustrated case with horizontal bars. If the shaft 8 rotates clockwise, a hydraulic resistance is provided in front of the slot 4 which is opposite the direction of rotation of the agitator, composed of the hollow shaft 8, the arms 10 and paddles 11. In the case of the illustrated embodiment it is provided by a shield 12, covering the slot 4 and equalizing the passage of liquid through both slots 4 and 4' from the space A to space B.

A drain pipe 13 for the clear water, which has collected at the top of the space C, is provided at the top below the roof-shaped distributor baffle 6. A rinsing conduit 14 provided with openings, which is normally out of operation and serves solely for cleaning the clarifier, is provided at the bottom of the space B near the slots 4 and 4'. Collecting troughs 15 for removal of the clear water from the space B are arranged at the top of this space at a certain distance above the level of the slots 5, said collecting troughs being connected with the filter space F. The sedimentation space C is separated from the space F with a high-rate filter by a hollow wall 16 consisting in this case of a number of closely adjacent beams 17 with first longitudinal channels 18 connected by openings 19 with the sedimentation space C and terminating into the drain and with second longitudinal channels 18' connected by openings 20 with the filter space F and with the collecting troughs 15 and the drain pipes 13 for clear water terminating into said second longitudinal channels 18'. A multilayer filter 21 with filter layers of successively finer grain is provided in the filter space F. The filtered clear water is drained from the bottom of the filter space F.

In the axonometric schematic view in FIG. 2 there are furthermore indicated the motor drive 22 for the hollow shafts 8, and the supply trough 23 for the raw water with the coagulant which is led through conduits 24 by gravitation into hollow shafts 8 and into the coagulation and homogenizing space A.

The described arrangement operates as follows:

The dosed raw water with the coagulation agent streams from the supply trough by gravitation through the conduits 24 into the hollow shafts 8, where it is uniformly distributed within the whole length of the coagulation and homogenization spaces A via the openings 9. The shafts 8 are driven by means of the motor drives 22 at a rotating speed on the order of units of revolution per minute and flocks which originate here by coagulation are in the spaces A homogenized and densified by the agitator means composed of the elements 8, 10, 11 whereby they subsequently proceed from the circumference of the hollow shaft 8 towards the circumference of the agitator means and pass finally together with the liquid through the slots 4, 4' into the spaces B, whereby the shields 12 provide for uniform passage of the liquid through both slots 4 and 4' into the space B in order that the influence of rotation of the agitator means 8, 10, 11 on the passage of liquid should be compensated and the sludge blanket in the space B maintained constantly in floating condition in a uniform manner within the whole space B. The time of stay of the liquid in the coagulation and homogenization space A should be about 15 minutes. From the space B with the sludge blanket the flocculate suspension passes through inlet slots 5 by way of the roof-shaped distributor baffle 6 into the sedimentation space C, whereby the initial entrance speed is subsequently reduced in the downward widening space C, facilitating sedimentation of the suspension and separating of the taken-along water, which collects below the roof-shaped distributor baffle 6 and is drained therefrom by the drain pipe 13. The suspension, which has dropped to the bottom of the space C, enters by way of the openings 19 into channels 18 of the horizontal separating wall 16 and is drained therefrom. The cleared water which collects above the sludge blanket, passes over into collecting troughs 15 and from there into channels 18' in the horizontal wall 16 and by way of openings 20 into the space F with filters 21; after passage through said filters 21 it collects at the bottom and is drained for use.

The main advantage of the novel multislot liquid clarifier with a high-rate filter in a single column container is the fact that the whole unit need not be tall but still provides for high and very high outputs, for instance of 100 to 1,000 liters per second. Thus a very favorable specific volume of the arrangement for an output of 1 liter per second, and simultaneously large economic savings are achieved. Another great advantage of the connection of multislot clarifier with a hydraulically perfectly floating sludge blanket and with horizontally joined parallel functional spaces is the possibility to arrange prior to separation of impurities by means of the perfectly floating sludge blanket, a homogenization space where the created suspension is uniformly homogenized by turbulence generated by mechanical means and for a sufficiently long time, thus achieving a high output of the separating processes comparable with results obtained for small installations. With the introduction of homogenization a degree of removal of the coagulation agent from the filtrate up to the limit of its solubility and removal of micro-organisms up to the quality required by rules for drinking water can be achieved, without disinfecting the filtrate. A further advantage is the arrangement of the thickening space for the sludge and of the filter space one above the other, separated by a hollow horizontal wall formed by closely arranged beams with longitudinal channels enabling a full use of the thickening space. Simultaneously the distributing systems are also simplified and the height of the whole arrangement is reduced.

We claim:

1. Apparatus for water treatment, comprising in combination, housing means defining an interior space; wall means subdividing said interior space into a plurality of sets of elongated substantially horizontal parallel operating spaces each including a coagulating zone, a laterally adjacent filtration zone, and a sludge-blanket zone located directly above said coagulating and filtration zones and containing a perfectly fluidized sludge blanket; filter means in the lower region of said filtration zones; supply means for supplying a mixture of raw water and coagulating agent into said coagulating zones; agitating means for agitating said mixture in said coagulating zones; first slot means connecting said coagulating zones with the lower regions of the associated sludge-blanket zones below the level of the sludge blankets therein; second slot means connecting the upper regions of said filtration zones with the sludge-blanket zones at the level of the sludge blankets therein; first collecting means for collecting clarified water from the upper regions of said filtration zones; and second collecting means for collecting partially clarified water from said sludge-blanket zones above the sludge blankets in the same, and for admitting said partially clarified water into the lower regions of said filtration zones for passage through and clarification in said filter means.

2. Apparatus as defined in claim 1; and further comprising hydraulic resistance means provided at the respective first slot means for equalizing hydraulic resistance at opposite sides of said first slot means.

3. An apparatus as defined in claim 1; further comprising substantially horizontal wall portions extending between and separating the upper regions and the lower regions of the respective filtration zones from one another; and drain means communicating with said upper regions in the vicinity of said horizontal wall portions for evacuating sediment from said upper regions of said filtration zones.

4. Apparatus as defined in claim 1, said agitating means comprising at least one at least substantially horizontal shaft arranged in each of coagulating zones extending longitudinally of the same, turbulence-creating means affixed to said shaft projecting therefrom, and rotating means for rotating said shaft.

5. Apparatus as defined in claim 4, wherein said shaft is hollow and provided with a plurality of longitudinally spaced openings, and wherein said supply means communicates with the interior of said shaft.

6. Apparatus as defined in claim 4, wherein said turbulence-creating means comprises a plurality of paddles projecting from said shaft.

7. Apparatus as defined in claim 2, wherein said resistance means comprises baffle means.

8. Apparatus as defined in claim 3, said horizontal wall portions being provided with first channels communicating with said upper regions and with said drain means, and with second channels communicating with said second collecting means.

9. Apparatus as defined in claim 8, said channels being interior channels.